T. Schankwiler,
Horse Power.

No. 33,755.    Patented Nov. 19, 1861.

Witnesses
J. Fraser
D. C. Johnson

Inventor
Thomas Schankwiler

UNITED STATES PATENT OFFICE.

THOMAS SCHANKWILER, OF FAYETTE, NEW YORK.

MODE OF CONSTRUCTING HORSE-POWERS.

Specification of Letters Patent No. 33,755, dated November 19, 1861.

*To all whom it may concern:*

Be it known that I, THOMAS SCHANKWILER, of Fayette, in the county of Seneca and State of New York, have invented a new and useful Improvement in Horse-Powers; and I do hereby declare that the following is a full and exact description thereof, reference being had to the accompanying drawings, in which—

Figure 1:
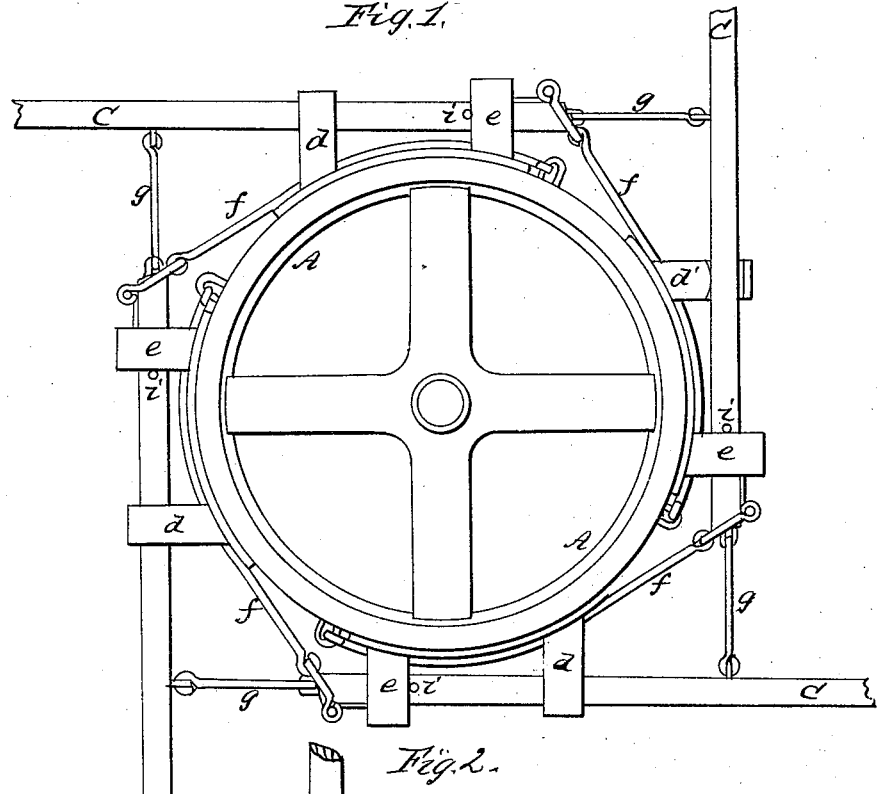
Figure 2:
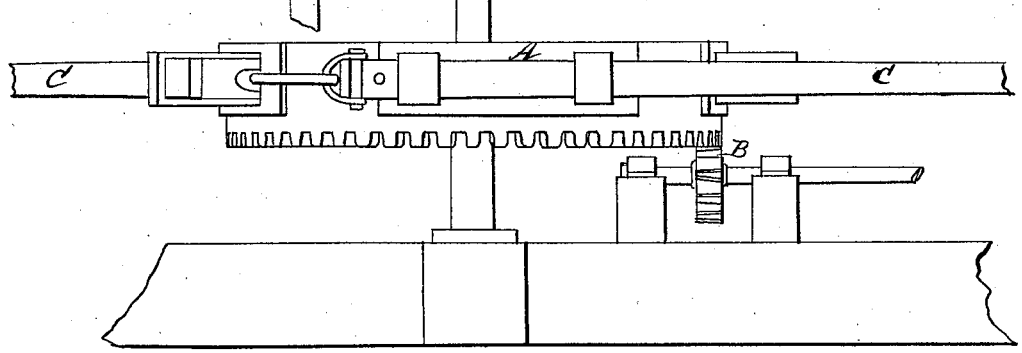

Figure 1 is a plan view, and Fig. 2 is a side elevation thereof.

Like letters designate corresponding parts in both of the figures.

My improvement relates to the manner of connecting the draft-arms or levers with the driving wheel for the purpose of overcoming their liability to break from use; economizing the power employed, and equalizing the draft to the different teams.

As represented in the drawings A is the driving wheel, B the pinion, and C C the draft-arms which are not connected directly to the wheel, but rest loosely in two sockets, $d$, $e$, on its periphery, and are attached to it by a connecting rod $f$. The lever is allowed a limited sliding, or longitudinal motion in the sockets, restricted one way by the extent to which the rod $f$ will yield by its flexibility and in the other by the pin $i$. The foremost socket has a fulcrum bearing, (as shown in section at $d'$) against which the arm C bears when the draft is applied by which the power is exerted on two points of the wheel,—the fulcrum and the staple by which the rod $f$ is attached,—and these being situated on opposite sides of the wheel the strain on both points is exerted in the direction in which it revolves, so that not only the force of the short arm of the lever but that which is received by the fulcrum $d'$, is employed to move the wheel. As the draft of the horse in continually treading in a circle is liable to incline to the center this arrangement converts any such variance into an advantage in the multiplied effect of the force on the wheel at the end of the lever.

A very important advantage is gained in the flexibility of the fastenings of the lever over rigid ones, both in preventing the lever from breaking at its connection with the wheel, and in rendering the resistance less sudden at starting, and thereby avoiding injury to the horse. Another rod, $g$, connects the lever with the one preceding it, and that with the next, so that all are connected together; and the force applied to one arm is distributed to all parts of the wheel. This also obviates the danger of breaking the wheel by greater force being at one part than at another.

The rods $f$ pass through the socket $e$, which serves as a guide for them, and also for the lever which it only serves to hold in position. Chains may be used in place of the rods.

The whole construction admits of being made much lighter, and still possess the usual amount of strength, and the additional advantage of greatly economizing power and more equally distributing the labor of the teams employed. Chains may be used in place of the rods $f$ and $g$ with substantially the same effect.

I do not claim connecting the several levers together, but

What I claim as my invention and desire to secure by Letters Patent is—

The arrangement and combination of the levers C, draft rods $f$, fulcrum bearing $d$, socket $e$, and connecting rod $g$, substantially in the manner and for the purposes shown and described.

In witness whereof, I have hereunto signed my name in the presence of two subscribing witnesses.

THOMAS SCHANKWILER.

Witnesses:
J. FRASER,
FRANK W. HASTINGS.